Oct. 13, 1964  W. R. DUFFY  3,152,673
TROLLEY POLE GUIDE
Filed March 2, 1961

INVENTOR
WALTER R. DUFFY
BY
Pennie, Edmonds, Morton, Barrows and Taylor
ATTORNEYS United States Patent Office 3,152,673
Patented Oct. 13, 1964

3,152,673
TROLLEY POLE GUIDE
Walter R. Duffy, Butte, Mont., assignor to The Anaconda Company, a corporation of Montana
Filed Mar. 2, 1961, Ser. No. 92,902
5 Claims. (Cl. 191—35)

This invention relates to apparatus for guiding a pair of trolley poles of an electric vehicle into proper alignment with a pair of oppositely charged trolley wires from which the vehicle receives electric power. More particularly, this invention provides such apparatus characterized by a guiding device insulated from the wires for guiding the poles to their respective wires and a bracket on the vehicle for maintaining the poles in their proper relationship relative to the device and to each other.

Electric vehicles, such as the electric trolley trucks presently used in mining operations, have a pair of trolley poles attached thereto which extend outwardly to contact a pair of suspended trolley wires from which they receive their electric power. These electric trolley trucks generally have an auxiliary diesel motor by which they can be driven when not connected to the trolley wires. Because of the size and poor maneuverability of these trucks and other vehicles like them, it is difficult to align their two trolley poles properly relative to the two suspended trolley wires when the truck is driven by diesel power to the end of the trolley line.

It is an object of this invention to provide apparatus for properly aligning the trolley poles with respect to the trolley wires in an automatic fashion simply by driving the truck into approximate position beneath the wires.

The new apparatus for guiding a pair of trolley poles of an electric vehicle into proper alignment with a pair of oppositely charged trolley wires from which the vehicle receives electric power comprises a bracket mounted on the vehicle for extending the poles in proximity to the device. Means are included on the bracket for maintaining the poles properly spaced from each other. A guiding device is mounted at the inlet end of the wires and is insulated from the wires. The guiding device includes guiding surfaces to receive the spaced trolley poles and guide them to their respective trolley wires.

A preferred embodiment of the invention is described hereinbelow with reference to the accompanying drawing, wherein.

Figure 1:
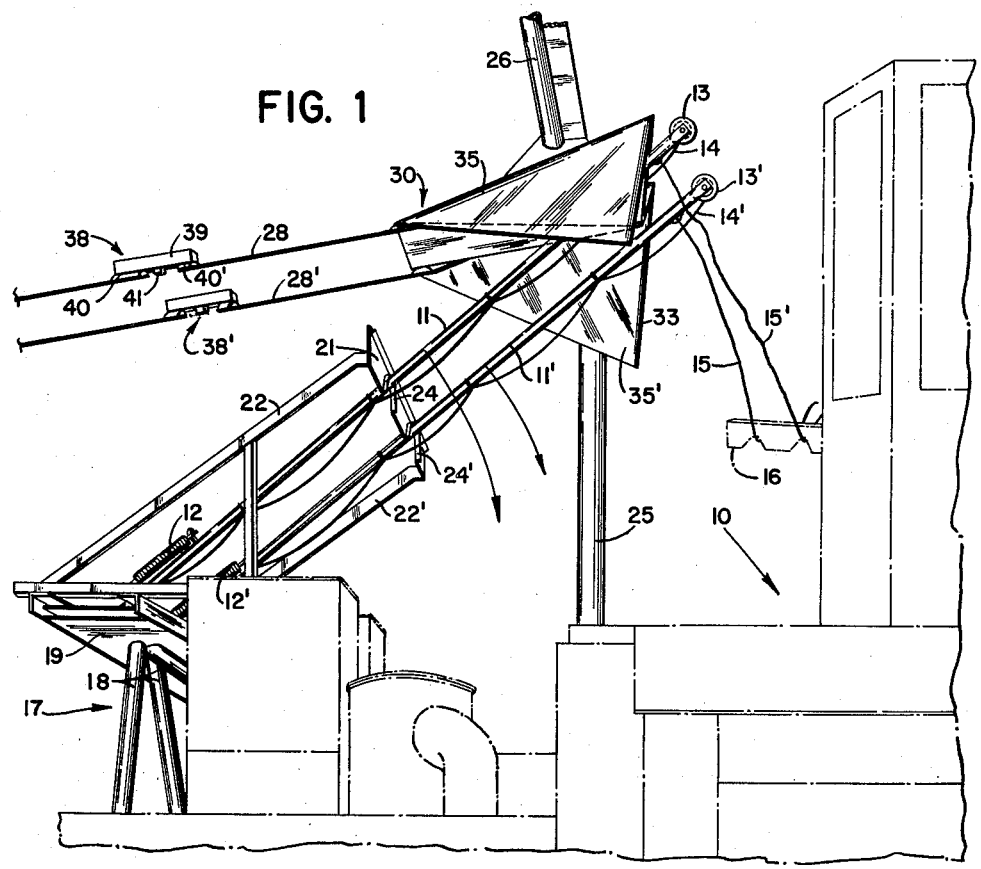
FIG. 1 is a perspective of the guiding device showing the trolley poles mounted on a vehicle and being inserted into the guiding device.

Referring initially to FIG. 1, a portion of an electric vehicle 10 of the type used for removing ore from mines is shown. Pivotally and resiliently mounted on the vehicle are a pair of trolley poles 11 and 11'. Springs 12 and 12' are secured to the respective trolley poles at their pivotal mounting and constantly urge the poles to the extended operating position shown. Mounted on the ends of the trolley poles are suitable trolley wire contacts 13 and 13'. These contacts 13 and 13' are indicated in the drawing to be rollers but any suitable design is contemplated. Exposed electrically conductive wires 14 and 14' are connected to each contact 13 and 13' and serve to transmit current therefrom to the vehicle 10. Attached close to the end of each pole is a wire 15 and 15' which serves as means for pivoting them from their extended position in which they are shown. A clamp 16 is mounted on the cab of the vehicle 10 on the same side as the trolley poles 11 and 11' are mounted and extends laterally from the cab. The purpose of the clamp 16 is to securely hold the trolley poles 11 and 11' once they have been retracted from their extended position. Mounted on the front end of the vehicle 10 is a bracket assembly 17 which is secured to the vehicle by a tripod-type structure of legs 18 which in turn supports a base portion 19. A transverse member 21 is secured to the bracket assembly 17 by means of supports 22 and 22' which extend upwardly at an angle to the base portion 19. A pair of notches 24 and 24' are formed in the transverse member 21 and are spaced from each other a distance substantially the same as the distance the trolley poles are mounted from each other. Hence when the trolley poles 11 and 11' are released from their retracted position they become lodged in their respective notches 24 and 24' and are thus maintained in their properly spaced relationship.

A tower 25 is vertically mounted on one side of the roadway along which the vehicle is to travel and has a superstructure 26 extending laterally therefrom over the roadway. A plurality of these towers are successively spaced along the entire length of the roadway to be traversed, with their superstructures 26 serving as supports for a pair of parallel trolley wires 28 and 28'.

Figure 3:
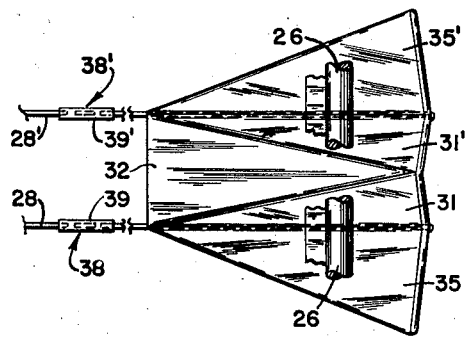
FIG. 3 is a top plan view of the guiding device.
Figure 2:
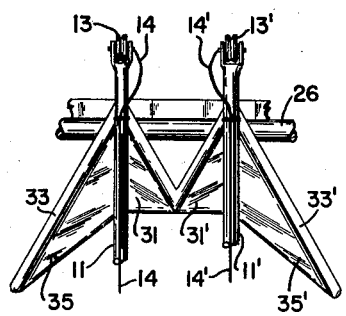
FIG. 2 is a fragmentary elevation of the guiding device taken from the inlet end thereof.

The tower shown in FIG. 1 is the first or starting tower and a guiding device 30 is supported by and depends from the superstructure 26. The guiding device consists essentially of two inverted V-shaped troughs 31 and 31' (as best shown in FIG. 2) which are joined together by a transverse triangular plate 32 as best shown in FIG. 3. The plate 32 serves to maintain the troughs 31 and 31' spaced from each other whereby the longitudinal extension of the recesses of the troughs are substantially parallel to each other so that they are in alignment with their respective trolley wires 28 and 28' attached to the outlet end of the device 30. It is of course contemplated that the troughs need not be V-shaped but rather could assume most any cross-section which has substantially deep longitudinally extending recesses formed therein.

It is to be noted that the edges of the device at the outlet end have a rolled edge 33 formed therein. The purpose of the rolled edge 33 is to permit the poles 11 and 11' to slide thereon without too much resistance when they first contact the guiding device 30 prior to being inserted into their proper troughs 31 and 31'. It is also desirable that the inlet end of the guiding device flare laterally outwardly to a wider expansion than the spacing between the trolley wires 28 and 28'. This is accomplished by extending the outer edge portions 35 and 35' of each of the V-shaped troughs 31 and 31' laterally outward at the inlet end of the guiding device 30 and progressively converging the same toward the trolley wires 28 and 28' at the outlet end of the device.

Because of this relatively wide opening at the inlet end of the device 30, the driver of the vehicle need only maneuver the vehicle so that the poles initially abut the rolled edge 33 on the inlet end of the device 30. Having abutted the device as described, the vehicle is advanced forward and the poles will slide into their proper troughs 31 and 31' with the contacts 13 and 13' riding in the recesses formed at the base of each trough and subsequently coming into contact with the trolley wire at the outlet end of the device 30.

The guiding device in this particular embodiment is metal. Therefore it is necessary that means for insulating the trolley wires 28 and 28' from the device 30 be included. The trolley wires 28 and 28' carry opposite charges and if this guiding device were not insulated from the charged trolley wires, short circuiting across the device 30 would occur. In the instant embodiment insulators 38 and 38' are included on each trolley wire 28 and 28' spaced some distance from the device. As a result, the trolley wires 28 and 28' directly connected to the device 30 do not carry any charge at all. The insulators 38 and 38' consist essentially of wooden blocks 39 with two trolley wire supports 40 and 40' secured to each end thereof. A center copper bar 41 is disposed between and spaced from the supports 40 and 40'. The center bar 41 serves as a neutral bar and prevents the trolley contact from acting as a conductor and thereby transmitting the current to the guiding device 30. It is of course to be noted that if the guiding device were constructed of some insulating material, the insulators just described would not be necessary.

I claim:

1. Apparatus for guiding a pair of trolley poles of an electric vehicle into proper alignment with a pair of oppositely charged trolley wires from which the vehicle receives electric power when connected thereto comprising a guiding device mounted at the inlet end of said wires, said guiding device having a pair of troughs defined therein, each of said troughs having a substantially wide opening at the inlet end of said device to receive the respective trolley poles, said troughs converging toward their respective trolley wires to guide the poles thereto, insulators on each of said wires adjacent said device to insulate said device from the electric charge of the wires, a bracket mounted on said vehicle for extending said poles in proximity to said device, and means on said bracket for maintaining said poles properly spaced from each other.

2. Apparatus for guiding a pair of trolley poles of an electric vehicle into proper alignment with a pair of oppositely charged parallel trolley wires from which the vehicle receives electric power when connected thereto comprising a guiding device consisting of a frame spanning and insulated from said trolley wires, a pair of troughs formed by said frame and constructed to receive said poles and maintain them spaced from each other, and an outlet end to which said trolley wires are connected and toward which said troughs converge, insulators on each of said wires adjacent said device to insulate said device from the electric charge of the wires, a bracket mounted on said vehicle for selectively extending said poles to a first position in proximity to said device and for retracting said poles to a second position away from said device, and means on said bracket for maintaining said poles properly spaced from each other, whereby said poles may be guided by the converging troughs to be connected to their respective trolley wires at the outlet end of said frame.

3. Apparatus for guiding a pair of trolley poles of an electrical vehicle into proper alignment with a pair of oppositely charged trolley wires from which the vehicle receives electric power when connected thereto comprising a guiding device consisting of a frame spanning and insulated from said trolley wires, said frame having an inlet end flaring laterally to a wider expansion than the spacing of said trolley wires, a pair of substantially V-shaped troughs formed by said frame and constructed to receive said poles and maintain them spaced from each other, and an outlet end to which said trolley wires are connected and toward which said troughs converge, insulations on each of said wires adjacent said device to insulate said device from the electric charge of the wire, a bracket mounted on said vehicle for selectively extending said poles to a first position in proximity to said device and for retracting said poles to a second position away from said device, and means on said bracket for maintaining said poles properly spaced from each other, whereby said poles may be guided by the converging troughs to be connected to their respective trolley wires at the outlet end of said frame.

4. For use in guiding a pair of trolley poles of an electric vehicle into proper alignment with a pair of oppositely charged parallel trolley wires from which the vehicle receives electric power when connected thereto, a guiding device comprising a frame spanning and insulated from said trolley wires, said frame having an inlet end flaring laterally to a wider expansion than the spacing of said trolley wires, a pair of troughs formed by said frame and constructed to receive said poles and maintain them spaced from each other, and an outlet end to which said trolley wires are connected and toward which said troughs converge, whereby said poles may be guided by the converging troughs to be connected to their respective trolley wires at the outlet end of said frame.

5. For use in guiding a pair of trolley poles of an electric vehicle into proper alignment with a pair of oppositely charged trolley wires from which the vehicle receives electric power when connected thereto, a guiding device comprising a frame spanning and insulated from said trolley wires, said frame having an inlet end flaring laterally to a wider expansion than the spacing of said trolley wires, a pair of substantially V-shaped troughs formed by said frame and constructed to receive said poles and maintain them spaced from each other, and an outlet end to which said trolley wires are connected and toward which said troughs converge, whereby said poles may be guided by the converging troughs to be connected to their respective trolley wires at the outlet end of said frame.

References Cited in the file of this patent

UNITED STATES PATENTS

| | | |
|---|---|---|
| 409,156 | Van Depoele | Aug. 13, 1889 |
| 528,149 | Cobb | Oct. 30, 1894 |
| 594,155 | Hoffman | Nov. 23, 1897 |
| 811,919 | Higgins | Feb. 6, 1906 |
| 872,674 | Noland | Dec. 3, 1907 |
| 1,294,204 | Upham | Feb. 11, 1919 |
| 1,817,093 | Morgan | Aug. 4, 1931 |
| 2,376,758 | Dahl | May 22, 1945 |